(12) United States Patent
Blasko

(10) Patent No.: US 6,636,693 B2
(45) Date of Patent: Oct. 21, 2003

(54) DC MOTOR MATRIX CONVERTER WITH FIELD AND ARMATURE CIRCUITS

(75) Inventor: Vladimir Blasko, Avon, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/916,696

(22) Filed: Jul. 27, 2001

(65) Prior Publication Data

US 2003/0021594 A1 Jan. 30, 2003

(51) Int. Cl.[7] ................................................. H02P 5/00
(52) U.S. Cl. ...................... 388/800; 318/759; 318/800; 318/762; 363/70; 363/127; 363/160
(58) Field of Search .......................... 388/800; 318/800, 318/759, 762; 363/127, 70, 160

(56) References Cited

U.S. PATENT DOCUMENTS

| | | | | |
|---|---|---|---|---|
| 4,393,442 A | * | 7/1983 | Kahkipuro | 363/70 |
| 4,414,619 A | * | 11/1983 | Kahkipuro | 363/70 |
| 6,130,832 A | * | 10/2000 | Julian | 363/127 |
| 6,163,472 A | * | 12/2000 | Colby | 363/127 |
| 6,262,555 B1 | * | 7/2001 | Hammond et al. | 318/759 |

\* cited by examiner

Primary Examiner—Robert E. Nappi
Assistant Examiner—Tyrone Smith

(57) ABSTRACT

A regenerative converter for a DC motor (55) having an armature (A, B) and a field (57), comprises a conventional three-phase matrix converter (6) including a three-phase bridge (7), the output of two phases being connected (52, 53) across the armature of the motor, the third phase being connected (58) to one end (I) of the DC motor field (57). The other end (K) of the DC motor field (57) is connected (59a) through a plurality of diodes (61–63) to respective phases of the input power.

4 Claims, 3 Drawing Sheets

DC MOTOR MATRIX CONVERTER WITH FIELD AND ARMATURE CIRCUITS

BACKGROUND ART

This invention relates to a three-phase matrix converter with diodes, providing controlled armature and field currents to a DC motor.

TECHNICAL FIELD

Matrix converters have been developed primarily to be used for direct AC to AC power conversion; typically, conversion is from multiple phase input power to multiple phase output power, where more than two phases are involved at the input and output. Due to recent advancements in semiconductor technology, matrix converters have become competitive for three phase to DC regenerative converters employing semiconductor switches and anti-parallel diodes.

FIG. 1 illustrates a known matrix converter 6 with three input phases and three output phases, which comprises a topology of choice for AC regenerative drives, such as are used in elevators. In FIG. 1, a conventional insulated gate, bipolar transistor bridge 7 receives three phases of input power on lines 8 from a conventional LC filter 9 which is connected to the three phases R, S, T of AC power mains 10. Each of the switches S11–S33 within the bridge 7 comprises two sets, each set including an insulated gate bipolar transistor (IGBT) and antiparallel diode, such that each switch is bidirectional. As is known, by selective operation of the switches S11–S13, S21–S23, S31–S33 within the bridge 7, the bridge provides three-phases of voltage A, B, C on bridge output lines 45–47 to a three-phase induction motor (IM) 50.

By connecting switches Sij, where i indicates the output phase 1, 2 or 3 and j indicates input phase 1, 2 or 3, output voltages are created in a pulse width modulation fashion from input voltages. Switches Sij are turned on and off in such a way that locally averaged output voltages and input phase current are sinusoidal. Two switches in the same output phase are not turned on at the same time, since that would create a short circuit between two input phases. Current in any of the output phases cannot be interrupted without providing an alternate path. Operation and methods for controlling matrix converters are treated extensively in the following literature: C. L. Neft and C. D. Schauder, "Theory and design of a 30-hp matrix converter," IEEE Trans. Ind. Applicat., vol. 28, no. 3, pp. 546–551, 1992; L. Hube and D. Borojevic, "Space vector modulated three-phase to three-phase matrix converter with input power factor correction," IEEE Trans. Ind. Applicat., vol. 31, pp. 1234–1246, November/December 1995; P. Nielsen, F. Blaabjerg, J. K. Pedersen, "New Protection Issues of a Matrix Converter: Design Considerations for Adjustable-Speed Drives", IEEE Transactions on Industry Application, pp. 1150–1163, Volume 35 Number 5, September/October 1999.

In FIG. 2, only two poles of the bridge 7, S11–S13 and S3–S33, are utilized to provide two poles of DC voltage A, B on a pair of lines 52, 53 to the armature of a DC motor 55. Although the range of output frequencies for matrix converters includes zero Hertz, the use of a three phase-to-three phase matrix converter for a DC drive, as illustrated in FIG. 2, is not practical since it provides power only to the armature circuit, and provides no power to the field circuit. This problem can be overcome by using a three-phase to four-phase matrix converter as illustrated in FIG. 3, with alternate output phases connected to the armature and to the field respectively. FIG. 3 differs from FIG. 2 by providing second and third poles, S21–S23 and S41–S43, within a bridge 7a to provide connections to the nodes 1, K of the field 57 of the DC motor 55 on related lines 58, 59. The circuit and its controller, however, are more complex and costlier than the circuit of FIG. 1, and it is not a practical solution.

In the elevator industry, there are many existing elevator installations with DC motors, and it would be beneficial to be able to drive those motors more effectively with matrix converters, both in new equipment and as a retrofit upgrade. It would also be advantageous to utilize essentially identical converter apparatus for both AC and DC installations.

DISCLOSURE OF INVENTION

Objects of the invention include provision of a matrix converter which is readily adapted for use either with AC or DC motors; provision of means for readily adapting a three-phase to three-phase matrix converter for use in driving DC motors; a low cost and efficient method of upgrading existing DC elevator drive motors for control by matrix converters; and a relatively simple, cheap and easily used adaptation of a three-phase-to-three-phase matrix converter for use driving DC motors.

This invention is predicated in part on the recognition of the fact that a DC motor driven with three-phase power by a regenerative matrix converter need not have bidirectional currents in the field winding, and therefore does not require a conventional three-switch matrix converter pole for powering the DC motor field winding.

According to the present invention, two outputs of a conventional three-phase-to-three-phase matrix converter are applied across the armature of a DC motor, and the field of the DC motor is connected from the third output thereof through phase-related diodes to respective phases of the input power lines. In accordance further with the invention, the diodes may be represented in a kit which is easily attached to a conventional three-phase-to-three-phase matrix converter, thereby adapting a converter for driving regenerative AC motors to a converter for driving regenerative DC motors.

The invention permits utilizing a standard regenerative matrix converter through a wide range of elevator drives, adapting the matrix converter for DC use with a simple diode kit, if desired, but otherwise using the matrix converter for an AC drive when appropriate.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
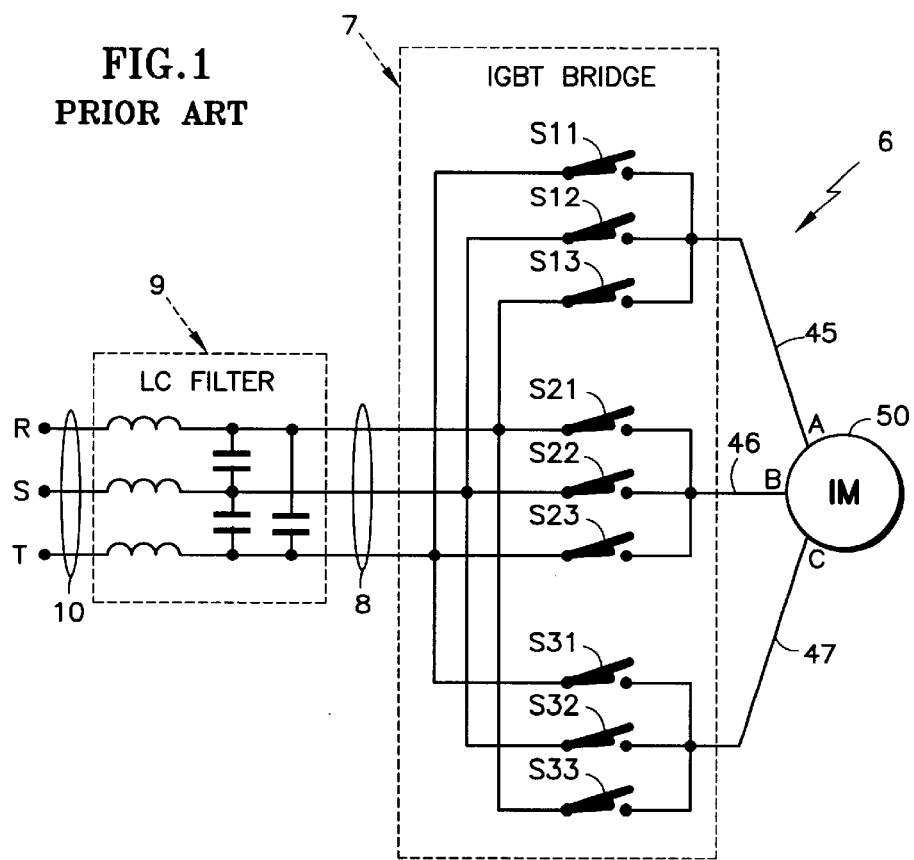
FIG. 1 is a simplified, schematic diagram of a conventional three-phase-to-three-phase matrix converter.
Figure 2:
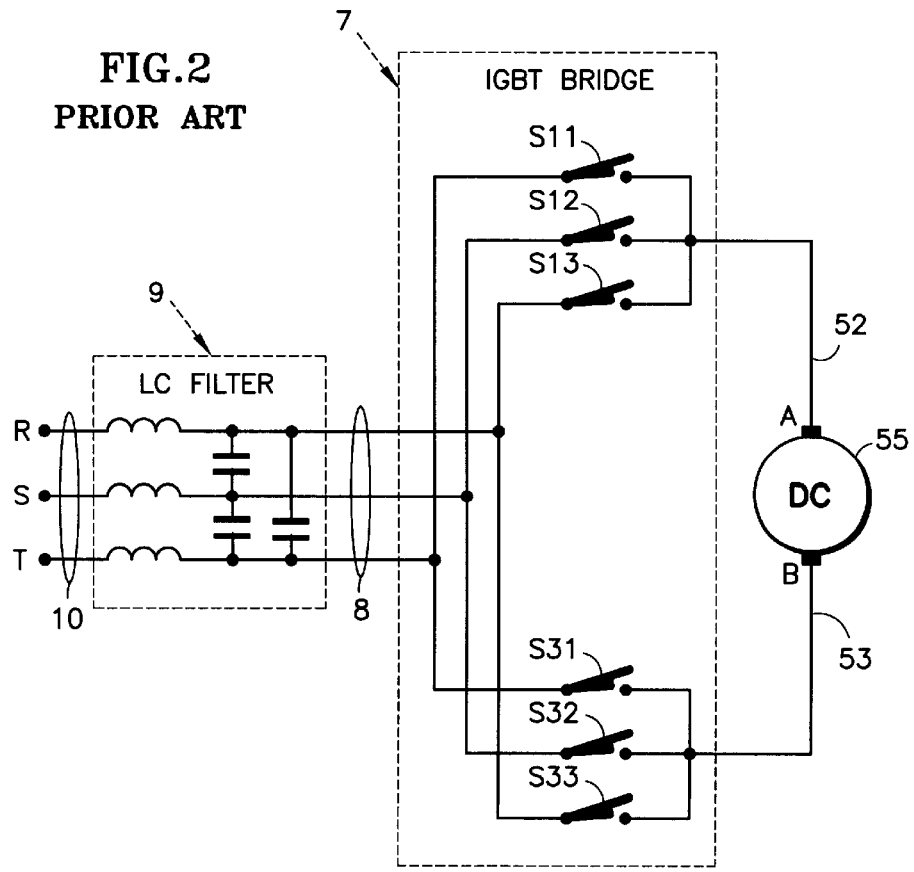
FIG. 2 is a simplified, schematic diagram of a conventional three-phase to DC matrix converter.
Figure 3:
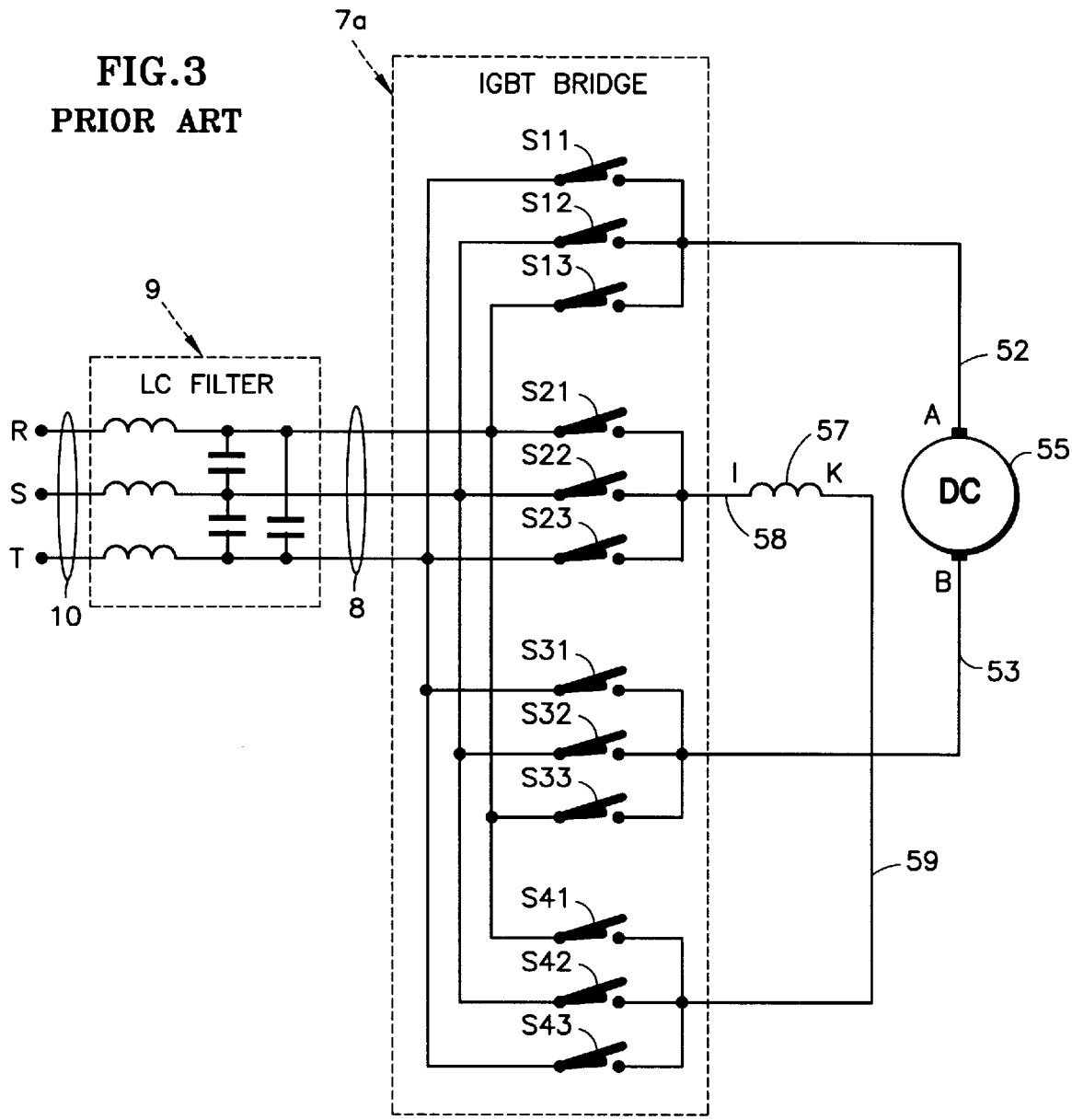
FIG. 3 is a simplified schematic diagram of a conventional three-phase to four-phase matrix converter for controlling armature and field circuits of a DC motor.
Figure 4:
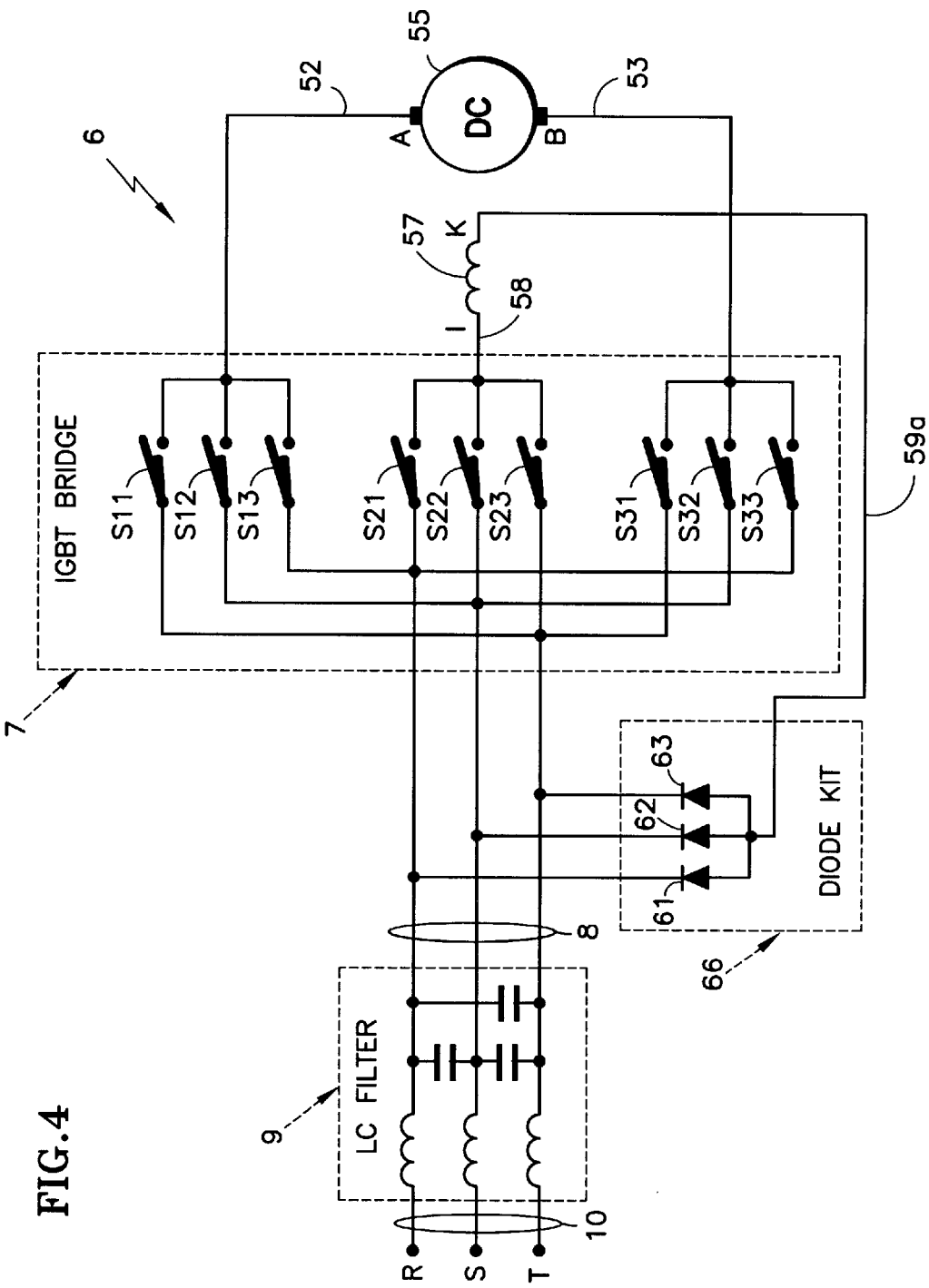
FIG. 4 is a simplified schematic diagram of a three-phase to three-phase matrix converter, with field diodes to provide power to the field of a DC motor, in accordance with the present invention.

Referring to FIG. 4, one pole S21–S23 of the matrix converter bridge 7 is connected to one node I of a DC motor field winding 57, and the K node of the DC motor field winding 57 is connected by a line 59a to a plurality of diodes 61–63 in addition to and apart from the matrix connector, poled to conduct from the field winding 57 to the respective AC mains, R, S, T. The diodes 61–63 may be provided in a kit 66 as to facilitate converting the use of the conventional three-phase IGBT matrix converter 6 from controlling an induction motor 50 (FIG. 1) to controlling a DC motor 55, 57. The diodes may have the polarity shown or the opposite polarity; the polarity only selects the direction of the field winding current which in turn alters the direction of motor rotation with respect to the polarity of armature current. Since the field winding comprises a very large inductance, control of motor direction by means of field currents is not practical; instead, motor direction is controlled by means of the armature current. Therefore, the polarity of field current can be invariant. As shown, the diodes 61–63 provide to the field 57 the most negative voltage of any of the three phases R, S, T of the AC power lines 8. The switches S21–S23 carry current in only the direction established by the diodes. Therefore, only one set of IGBT and diode is required. As shown in FIG. 4, the emitter will be connected to the field winding 57.

The control for the bridge of FIG. 4 may readily be devised by those skilled in the art, by controlling the armature current and the field current for the particular use to which it is to be put, in accordance with well-known principles, such as disclosed, for example, in Leonhard, Werner: *Control of Electrical Drives*, $2^{nd}$ Ed., Springer-Verlag: New York, 1996.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A regenerative DC converter for controlling a DC motor having an armature and a field winding, comprising:

a three-phase-to-three-phase matrix converter including a three-pole bridge having three input poles for respective connection to three-phase input power and having three output poles, two of said output poles for connection across the armature of a DC motor, the third of said output poles for connection to one terminal of the DC motor field winding; and a plurality of diodes in addition to and apart from said three-phase-to-three-phase matrix converter, each for connection between a respective phase of said input power to the other terminal of said DC motor field winding.

2. A regenerative DC converter for controlling a DC motor having an armature and a field winding, comprising:

a three-phase-to-three-phase matrix converter including a three-pole bridge having three input poles for respective connection to three-phase input power and having three output poles, said matrix converter capable of driving a conventional induction motor by connecting each of said output poles to a corresponding pole of the induction motor, two of said output poles for connection across the armature of a DC motor, the third of said output poles for connection to one terminal of the DC motor field winding; and a plurality of diodes in addition to and apart from said three-phase-to-three-phase matrix converter, each for connection between a respective phase of said input power to the other terminal of said DC motor field winding.

3. A converter a cording to claim 2 wherein:

said diodes are arranged in a kit which is attachable to said three-phase-to-three-phase matrix converter.

4. A DC motor system comprising:

a DC motor having a armature and a field winding;

a three-phase-to-three-phase matrix converter including a three-pole bridge having three input poles for respective connection to three-phase input power and having three output poles, two of said output poles connected across the armature of said DC motor, the third of said output poles connected to one terminal of said DC motor field winding; and a plurality of diodes in addition to and apart from said three-phase-to-three-phase matrix converter, each connected between a respective phase of said input power to the other terminal of said DC motor field winding.

* * * * *